United States Patent [19]

Spitzer et al.

[11] Patent Number: 5,133,874
[45] Date of Patent: Jul. 28, 1992

[54] REMOVAL OF HUMATE FROM BAYER ALUMINA LIQUORS

[75] Inventors: Donald P. Spitzer, Riverside, Conn.; Peter J. Strydom, Morristown, N.J.

[73] Assignee: American Cyanamid Company, Stamford, Conn.

[21] Appl. No.: 632,838

[22] Filed: Dec. 24, 1990

[51] Int. Cl.$^5$ .............................. B01D 21/01
[52] U.S. Cl. .................... 210/734; 210/727; 210/735; 423/121; 423/122; 423/130
[58] Field of Search .............. 210/725, 727, 728, 733, 210/734, 735; 423/121, 122, 130

[56] References Cited

U.S. PATENT DOCUMENTS

| | | | |
|---|---|---|---|
| 4,578,255 | 3/1986 | Roe et al. | 423/121 |
| 4,789,485 | 12/1988 | Field et al. | 423/121 |
| 4,902,425 | 2/1990 | Keeney | 210/735 |

Primary Examiner—Peter Hruskoci
Attorney, Agent, or Firm—Frank M. Van Riet

[57] ABSTRACT

A process is disclosed for reducing the turbidity of a Bayer process liquor containing a cationic polymer-humate complex comprising adding to said liquor a higher molecular weight, cationic polymer.

6 Claims, No Drawings

REMOVAL OF HUMATE FROM BAYER ALUMINA LIQUORS

The present invention relates to the removal of polymer-humate complexes from the Bayer process liquors.

BACKGROUND OF THE INVENTION

The recovery of alumina as alumina trihydrate from bauxite is accomplished in the Bayer process by digestion of the bauxite in a caustic medium at elevated temperatures and pressure. The resultant saturated sodium aluminate solution, know as the pregnant liquor, is part of a red mud slurry from which the inorganic, suspended solids are separated in two stages so as to prevent their contamination of the alumina product. In the primary settlement stage, flocculants are used to promote settlement of solids. The second stage is a pressurized filtration used to remove very fine suspended particles. The filtrate is then seeded to precipitate the alumina.

Bauxite contains organic impurities which are coextracted with the alumina during digestion and contaminate the liquor. Most of the organic impurities are high molecular weight compounds, such as humic acid, a portion of which decomposes to lower molecular weight compounds during digestion, producing a spectrum of organic salts dissolved in the liquor. Part of the organic impurities are color causing compounds called humates and impart a red-brown color to the liquor. Because the Bayer process involves continual recycling of the used caustic liquor to the digestion stage, the organic impurity content of the liquor increases with each recycle of the caustic liquor. If the humates are allowed to accumulate, the quality of alumina hydrate produced is affected and the colored material acts as a stabilizer for other dissolved organic impurities, such as oxalic acid.

Humate stabilization keeps low molecular weight organics in solution until over-saturated concentrations exist. Uncontrolled precipitation of the organics, particularly fine oxalates, then occurs during precipitation of the alumina hydrate thus interfering with satisfactory production of alumina hydrate. The oxalate causes nucleation of alumina hydrate with the resulting formation of very fine alumina hydrate that does not meet product standards. The oxalate may also precipitate on the surface of the alumina seed crystals and prevent the precipitation of alumina hydrate when desired. Oxalate also precipitates as scale on the walls of production vessels and thereby decreases heat transfer. Thus, humate removal is essential to the efficient running of the Bayer process.

The use of cationic polymers as flocculants for the Bayer process is reported in U.S. Pat. No. 4,578,255 and WO 87/00825. In the latter patent, the polymers were effective in separating the suspended solids, however, the samples treated were simulated bauxite using 20 g/l of China clay and 200 g/l of sodium hydroxide. Since native bauxite samples were not used, the substrate did not contain humates and therefore the problem solved was not comparable to the problem to be solved by this invention.

Bayer process liquors from native bauxite were treated with polydiallyldimethylammonium chloride with concentrations up to 200 mg/l with up to 50% reduction in absorption due to the humate in U.S. Pat. No. 4,578,255. Whereas this is a significant reduction of humate, the process fails to separate colloidal polydiallyldimethylammonium chloride complexes that often form, pass through the filter and continually build up in the recycled Bayer liquors.

SUMMARY OF THE INVENTION

According to the present invention, there is provided a process of reducing the turbidity of a Bayer process liquor containing cationic polymer-humate complexes which normally pass through the filter in the filtering process by adding an effective amount of a second and higher molecular weight, cationic polymer to said liquor and filtering to remove the resultant flocculated polymer-humate complexes.

DETAILED DESCRIPTION OF THE INVENTION

Bayer process liquor clarification has particular problems that are difficult to overcome. It is important that the liquors be of high purity, since impurities carried to the later stages of the alumina recovery process reduce the purity of the alumina and/or cause difficulties in the process operations. In the first stage of purification, inorganic suspended solids are settled. Starch and polyacrylates are used for the initial settlement to a point but an increase of anionic or non-ionic flocculant concentrations does not improve results and may increase blinding of the second stage filters. The second stage clarification or polishing of the resultant liquor uses a pressure filter such as a Kelly filter to remove fine, suspended particles. Humates may be removed, in part, at this stage by the addition of water-soluble, polymeric quaternary ammonium salts, see U.S. Pat. No. 4,578,255 above. Most of the polymer-humate complex does precipitate and is removed from the Bayer system, generally with the underflow in the primary settlers. Oftimes, however, the complexes formed are too small (are colloidal) to precipitate by themselves but are built up to larger particles by the process of the present invention.

That is to say, it has been found that the more polymer, e.g. polydiallydimethylammonium chloride, used, the more humate is removed with a concomitant increase in turbidity of the Kelly filter filtrate. Thus, the greater the amount of cationic polymer used, the greater the amount of cationic polymer-humate colloidal and semicolloidal complexes that pass through the filter. For example, the average turbidity of a Bayer process plant settler filtrate liquor is a particular Bayer plant ranges from 0.8 N.T.U. to 1.4 N.T.U. and is about 1.1 N.T.U. on an average. On the addition of 24 mg/l of polydiallyldimethylammonium chloride, the filtrate turbidity increases to 2.5 N.T.U. while with the addition of 40 mg/l of polydiallyldimethylammonium chloride, the turbidity will range from 2.6 N.T.U. up to 4.0 N.T.U. Since the Bayer liquors are recycled, the increasing concentration of colloidal and semicolloidal polymer-humate complexes with each cycle causes processing and/or alumina recovery difficulties in the final steps of the process.

The present invention comprises a process for removing cationic polymer-humate colloidal and semicolloidal complexes by the addition of an effective amount, e.g. from about 0.1 mg/l to about 500 mg/l, preferably about 0.1 mg/l to about 50 mg/l of a second, higher molecular weight, cationic polymer after or together with the lower molecular weight cationic polymer to the process liquor and, after mixing, removing the flocculated polymer-humate complexes. The second, higher molecular weight, cationic polymer may be produced from the same monomers or from different monomers as the first polymer and may be added before or after the Kelly pressure filter in the Bayer process and the flocculated polymer-humate complexes may be removed by filtration, centrifugation or like. The turbidity of the liquor after humate removal by the addition of the second cationic polymer can be reduced to a turbidity as low as the initial liquor (1.0 N.T.U. to 1.3 N.T.U.).

The polymer used to initially complex the humates comprises any water-soluble, cationic polymeric quaternary ammonium salt of which homopolymers of diallyldimethylammonium chloride with an intrinsic viscosity, as defined in U.S. Pat. No. 4,578,255, of at least 0.1, and preferably an intrinsic viscosity in the range of 0.3 to 1.0, are preferred. Vinylic copolymers of diallyldimethylammonium chloride such as the copolymers of 90/10 to 10/90 alkylacrylate, alkylmethacrylate or acrylamide with diallyldimethylammonium chloride having an intrinsic viscosity from 0.2 to 1.5 or slightly above may also be used. Other polyquaternary salts which can tolerate the heat and the pH extremes of the Bayer process will also function to complex the humates. Diallyldimethylammonium chloride may be polymerized in the presence or absence of alkylacrylates, alkylmethacrylates, acrylamide and the like by standard vinyl polymerization techniques but is preferably polymerized by a free radical process. The polymers are quaternized by any process known in the art. Polymers of this type are described in U.S. Pat. No. 3,288,770, which is incorporated herein by reference.

The second, higher molecular weight, cationic polymer which is used to flocculate the cationic colloidal or semicolloidal first polymer-humate complexes in accordance with the present invention comprises any one of a number of polymers which contain quaternised recurring units derived from monomers of the formula $$CH_2=C(R)CONHR^1NR^2R^3$$

wherein R is hydrogen or methyl, $R^1$ is a straight or branched chain $C_{2-8}$ alkylene group and $R^2$ and $R^3$ are independently selected from $C_{-4}$ alkyl. $R^1$ may be, for instance, ethylene, isopropylene, t-butylene, etc. The groups $R^2$ and $R^3$ are generally individually selected from methyl and ethyl. Preferred polymers of this class are copolymers of 90/10 to 0/100 acrylamide/dimethylaminoethyl(meth) acrylate quaternary and 90/10 to 0/100 acrylamide/methylacrylamidopropyltrimethyl ammonium chloride. A preferred polymer not of this class is 90/100 to 10/90 acrylamide/diallyldimethyl ammonium chloride. As mentioned above the polymer may be the same chemically as the first as long as its molecular weight is higher.

Suitable quaternising groups are $C_{1-4}$alkyl or hydroxyalkyl, such as methyl, ethyl, propyl or 2-hydroxy ethyl, preferably methyl or ethyl. Suitable counterions are chloride, sulphate, methyl sulphate, acetate and nitrate. The recurring unit may, for instance, be quaternised with ethylene oxide or epichlorhydrin in an acid, to give the N-(2-hydroxyethyl) derivatives. The quaternising groups may themselves contain quaternary nitrogen atoms, for instance, as described in U.S. Pat. No. 4,495,367. Preferred quaternising compounds are methyl chloride and dimethyl sulphate.

The second, higher molecular weight, cationic polymer may be a homopolymer of the specified units or a copolymer with other copolymerized ethylenically unsaturated comonomers, such as other acrylic monomers, provided these other monomers do not significantly detract from the required properties of the polymer, i.e., stability at high pH and temperature. In some instances, the homopolymers are preferred but copolymers are often more efficient commercially. Generally, the polymer contains at least 10% cationicity, but higher cationicity polymers of 25% to 100% are more effective. The comonomers are usually non-ionic, and suitable comonomers include (meth)acrylamide, N-vinyl-N-methylacetamide, vinyl pyrollidone and vinyl acetate. Generally, the comonomer is acrylamide.

The second, cationic polymers must have a higher molecular weight, than the first polymer. Small amounts of deliberate cross linking or chain branching are acceptable.

The second, higher molecular weight, cationic polymers are known in the art and are made by conventional processes such as gel polymerization or reverse phase emulsion polymerization. The polymer is added to the Bayer liquor in a conventional manner generally as a dilute aqueous solution. The polymers can be used in the Bayer liquor at a pH of about 11 to 14 and a temperature from about 60° C. to 110° C.

The two polymers use in the instant process may be added as solids, gels, suspensions or aqueous solutions to the Bayer process liquor prior to or after the Kelly pressure filter. The two polymers may be added in any sequence or in admixture. It is preferred, however, to add the polymer with the lower molecular weight first. If the polymers are added after the Kelly filtration, a second filtration may be required. An advantageous variant of the invention is the use of filter aids such as certain calcium compounds to help remove the flocculated polymer-humate complexes.

DESCRIPTION OF THE PREFERRED EMBODIMENTS

The following examples illustrate the present invention. They are not be construed to limit the claims in any manner whatsoever.

A. A quantity of 1.0 mg/l to 500 mg/l of a 10% to 50% aqueous solution of polydiallyldimethylammonium chloride (DADM) is added to a Bayer plant settler overflow liquor at 100° C. The liquor, after mixing, is filtered through a glass fiber filter paper to result in a turbid liquor filtrate.

B. To another sample of the same overflow is added polydiallyldimethylammonium chloride and a higher molecular weight polymer. These higher m.w. polymers are identified below. For copolymers, the ratio of monomers is given in mole percent.

DADM: A linear polymer of diallyldimethylammonium chloride with a molecular weight of 200,000.

90/10 AMD/DMAEA: A linear copolymer of 90 mole % of acrylamide and 10 mole % of dimethylaminoethylacrylate methyl chloride having an s.v. of $\geq 3.5$ c.p; m.w. $\geq 6 \times 10^6$.

85/15 AMD/DADM: A linear copolymer of 85 mole % of acrylamide and 15 mole% of diallyldimethylammonium chloride having an s.v. of $\geq 2.4$ c.p.; m.w. $\geq 3 \times 10^6$.

93/7 AMD/DADM: A linear copolymer of 93 mole % of acrylamide and 7 mole % of diallyldimethyl ammonium chloride; s.v. $\geq 2.4$; m.w. $\geq 3 \times 10^6$.

40/60 AMD/MAPTAC: A linear copolymer of 40 mole % of acrylamide and 60 mole % of methacrylamidopropyltrimethyl ammonium chloride; s.v.≧2.6; m.w. ≧3×10$^6$.

50/50 AMD/MAPTAC: A linear copolymer of 50 mole % of acrylamide and 50 mole % of methacrylamidopropyltrimethyl ammonium chloride; s.v.≧3.2; m.w.≧5×10$^6$.

66/34 AMD/MAPTAC: A linear copolymer of 66 mole % of acrylamide and 34 mole % of methacrylamidopropyltrimethyl ammonium chloride; s.v.≧3.2; m.w.≧5×10$^6$.

84/16 AMD/MAPTAC A linear copolymer of 84 mole % of acrylamide and 16 mole % of methacrylamidopropyltrimethyl ammonium chloride; s.v.≧3.0; m.w.≧4×10$^6$.

90/10 AMD/MAPTAC A linear copolymer of 90 mole % of acrylamide and 10 mole % of methacrylamidopropyltrimethyl ammonium chloride; s.v.≧3.0; m.w. 4×10$^6$.

DAEMA: A linear homopolymer of dimethylaminoethylmethacrylate methyl chloride; s.v.≧2.4; m.w. ≧3×10$^6$.

EXAMPLE 1

Table 1 demonstrates that the increase in turbidity in the filtrate is related to the amount of polydiallyldimethylammonium chloride added to the pregnant liquor prior to or after filtration. The concentration, in mg/l, of DADM added to the overflow liquor or to the filtrate is tabulated and the turbidity is measured at each level for both additions. It is clear that the turbidity of the filtrate increases with increasing concentrations of DADM.

TABLE I

| DADM mg./l. | Filtrate Turbidity N.T.U. | |
|---|---|---|
| | DADM Added to Overflow Liquor | Liquor Filtered Prior to DADM Addition |
| 0 | 0.8 | 0.5 |
| 10 | 1.5 | 2.0 |
| 20 | 2.3 | 3.0 |
| 40 | 3.9 | 4.0 |
| 60 | 3.9 | 4.6 |
| 100 | 3.9 | 4.7 |
| 200 | 5.5 | 5.5 |

EXAMPLE 2

At the same time, the amount of humate removed is directly related to the amount of polydiallyldimethyl ammonium chloride added. Table II exemplifies the concentration of DADM in mg/l versus the decrease in percent of absorbance at 440 nm, a measure of the removal of humate. Thus, with increasing concentration of DADM, there is increased removal of humate.

TABLE II

| DADM mg/l | Humate Removal as % Decrease in Absorbance | |
|---|---|---|
| | DADM Added to the Treated Overflow Liquor | Liquid Filtered Prior to DADM Addition |
| 10 | — | 0.4% |
| 20 | 4.8% | 2.0% |
| 40 | 3.5% | — |
| 60 | 5.0% | 3.0% |
| 100 | 14.0% | 8.0% |
| 200 | 12.0% | 12.0% |

The percent decrease in absorption is measured at 440 nm and is directly related to the humate removed.

EXAMPLE 3

By combining the results of Example 2 and 3, it is evident that increased turbidity (N.T.U.) is associated with humate removal.

TABLE III

| Turbidity in N.T.U. | Humate Removal as % Decrease in Absorbance | |
|---|---|---|
| | DADM Added to Overflow Liquor | Liquid Filtered Prior to DADM Addition |
| 0.4 | — | 0 |
| 0.9 | 0 | — |
| 1.5 | — | 0.9 |
| 2.3 | 4.5 | — |
| 3.1 | — | 2.0 |
| 3.8 | 4.0 | — |
| 4.0 | 5.0 and 15.0 | — |
| 4.5 | — | 4.0 and 8.0 |
| 5.5 | 12.5 | 12 |
| 6.6 | — | 14 |

EXAMPLE 4

Below, it is demonstrated that the turbidity due to the DADM-humate complex is eliminated by adding a different, high molecular weight, cationic polymer with the DADM. The high molecular weight, cationic polymer precipitates the colloidal and semicolloidal DADM-humate complex as larger particles that are removed by filtration.

A. A Bayer process plant settler overflow liquor at 100° C. is filtered through a glass fiber filter paper. The turbidity of the untreated filtrate (blank) is 1.5 N.T.U. for the first run sample in Table IV.

B. A 40% solution of DADM of 200,000 mol. wt. is diluted to 1.0% and is added to a portion of the same overflow liquor (at 100° C.) at the rate of 24 mg. real DADM per liter. After mixing for 2.0 minutes, the liquor is filtered through glass fiber filter paper. The filtrate turbidity has increased to 3.5 N.T.U.

C. The above addition B) of DADM is repeated with a portion of the same overflow liquor but with concurrent addition of 4.8 mg/l (as a 1.0% solution) of the high molecular weight, cationic polymer 90/10 AMD/DMAEA. After mixing for 2.0 minutes, the liquor is filtered through glass fiber filter paper. The turbidity is 1.5 N.T.U., i.e. that is, the same as the original untreated filtrate (blank).

D. Experiments with concurrent addition of DADM and polymer 90/10 AMD/DMAEA are repeated using various dosages of 90/10 AMD/DMAEA. The results are summarized in Table IV, where it is shown that as little as 0.96 mg/l of 90/10 AMD/DMAEA (equal to 4.0 wt. % of the DADM) restores the turbidity to the level of the original untreated liquor.

E. These experiments are repeated with other samples of plant overflow liquors with somewhat different blank turbidities as shown in lines 2, 3 and 4 of Table IV. The same beneficial effect is seen with the combination of 24 mg/l real of DADM and 90/10 AMD/DMAEA.

TABLE IV

| A. Turbidity N.T.U. Blank | B. Turbidity N.T.U. 24 mg/l of DADM | Turbidity N.T.U. of 24 mg/l Poly C. DADM and (mg/l) 90/10 AMD/DMAEA | | | | | | |
|---|---|---|---|---|---|---|---|---|
| | | 4.8 | 2.4 | 1.2 | 0.96 | 0.72 | 0.48 | 0.24 |
| 1.5 | 3.5 | 1.5 | — | 1.4 | 1.2 | 1.7 | 1.7 | 2.0 D |
| 1.1 | 3.8 | — | — | 1.2 | — | — | — | — E |
| 0.96 | 3.0 | 0.95 | 0.94 | 0.85 | — | — | — | — E |
| 0.83 | 2.5 | 0.74 | — | — | — | — | — | — E |

EXAMPLE 5

The procedure of Example 4 is again repeated using different plant settler overflow liquor at 100° C. and the high molecular weight polymer 85/15 AMD/DADM in combination with 24 mg/l real of DADM.

TABLE V

| Turbidity N.T.U. Blank | Turbidity N.T.U. 24 mg/l of DADM | Turbidity N.T.U. of 24 mg/l DADM and (mg/l) 85/15 AMD/DMAEA | | | |
|---|---|---|---|---|---|
| | | 4.8 | 2.4 | 1.2 | 0.72 |
| 1.1 | 3.0 | 0.9 | — | — | — |
| 1.3 & 1.4 | 3.5 | 1.3 | 1.4 | 1.4 | 1.8 |

As in Example 4, the same beneficial effect is seen in that addition of the high molecular weight polymer with DADM removes the humate-DADM complex and reduces the turbidity to that of the original blank settler feed.

EXAMPLE 6

The procedure of Example 4 is again followed except that 93/7 AMD/DADM is the high molecular weight polymer used with 24 mg/l real of DADM. The results in Table VI indicate a good reduction of turbidity at the 4.8 mg/l level of 93/7 AMD/DADM.

TABLE VI

| Turbidity N.T.U. Blank | Turbidity N.T.U. 24 mg/l OF DADM | Turbidity N.T.U. of 24 mg/l DADM and (mg/l) 93/7 AMD/DMAEA | | |
|---|---|---|---|---|
| | | 4.8 | 2.4 | 1.2 |
| 1.1 & 1.3 | 3.0 & 3.5 | 0.9 & 1.3 | 1.8 | 1.7 |

EXAMPLE 7

A number of high molecular weight polymers of varying cationicity are used in the same procedure as in Example 4 at a fixed dosage level of 4.8 mg/l of the high molecular weight polymer and 24 mg/l of DADM. The effect of the additives on turbidity is shown in Table VII wherein the initial overflow liquors samples have a turbidity in the range of 0.83 to 1.1 N.T.U.

TABLE VII

| Turbidity N.T.U. Blank | Turbidity N.T.U. 24 mg/l DADM | Turbidity N.T.U, of 24 mg/l DADM +4.8 mg/l of HMW Polymer | High mol. wt. Polymer |
|---|---|---|---|
| 0.83–1.1 | 2.5 | 1.1 | 40/60 AMD/MAPTAC |
| 0.83–1.1 | 2.5 | 1.1 | 50/50 AMD/MAPTAC |
| 0.83–1.1 | 2.5 | 1.3 | 66/34 AMD/MAPTAC |
| 0.83–1.1 | 2.5 | 1.4 | 84/16 AMD/MAPTAC |
| 0.83–1.1 | 2.5 | 1.6 | 90/10 AMD/MAPTAC |
| 0.83–1.1 | 2.5 | 2.0 | 100% DAEMA |

EXAMPLE 8

The procedures of Examples 4 and 5 are repeated using 40 mg/l real of DADM instead of 24 mg/l Higher dosages of 90/10 AMD/DMAEA and 85/15 AMD/DMAEA are required to restore the initial low turbidity.

TABLE VIII

| Turbidity N.T.U. Blank | Turbidity N.T.U. 40 mg/l of DADM | Turbidity of N.T.U. of 40 mg/l DADM and (mg/l) of high mol. wt. polymer | | | | |
|---|---|---|---|---|---|---|
| | | 8.0 | 6.0 | 4.0 | 3.0 | 2.0 |
| | | 90/10 AMD/DMAEA | | | | |
| 1.5 | 2.6 | 1.25 | — | — | — | — |
| 0.9 | 2.6 | 0.87 | — | — | — | — |
| 1.3 | 4.0 | — | — | — | 1.9 | 1.1 |
| 1.1 | 3.0 | 1.15 | 1.5 | 1.8 | — | 2.0 |
| | | 85/15 AMD/DADM | | | | |
| 1.1 | 3.0 | 1.7 | — | 2.0 | — | 2.2 |

It is of interest that the dual polymer treatment shows no measurable affect on plant settler overflow liquor on humate removal as measured by absorbance decrease at 440 nm.

Many variations of the present invention will suggest themselves to those skilled in this art in light of the above detail description; all such obvious modifications are within the full intended scope of the appended claims.

We claim:

1. A process for reducing the turbidity of a Bayer process liquor containing a cationic polymer-humate complex, wherein the cationic polymer of the cationic polymer-humate complex is a water soluble catonic quaternary ammonium slat having an intrinsic viscosity of about 0.1, which comprises adding to said liquor an effective amount of a second, higher molecular weight, cationic polymer to flocculate said cationic polymer-humate complex and thereafter removing the resultant flocculated polymer-humate complex from said liquor to reduce said turbidity.

2. The process of claim 1 wherein the complex is a polydiallyldimethylammonium chloride-humate complex and the second, higher molecular weight, cationic polymer is 90/10 to 0/100 acrylamide/dimethylaminoethylacrylate methyl chloride.

3. The process of claim 1 wherein the complex is a polydiallyldimethylammonium chloride-humate complex and the second, higher molecular weight, cationic polymer is 90/10 to 10/90 acrylamide/diallyldimethyl ammonium chloride.

4. The process of claim 1 wherein the complex is a polydiallyldimethylammonium chloride-humate complex and the second, higher molecular weight cationic polymer is 90/10 to 0/100 acrylamide/methylacrylamidopropyltrimethyl ammonium chloride.

5. The process of claim 1 wherein the complex is a polydiallyldimethylammonium chloride-humate complex and the second, higher molecular weight, cationic polymer is 90/10 to 0/100 acrylamide/dimethylaminoethylmethacrylate methyl chloride.

6. The process of claim 1 wherein the second, higher molecular weight, cationic polymer is derived from a monomer having the formula:

$$CH_2=C(R)CONHR^1NR^2R^3$$

wherein R is hydrogen or methyl, $R^1$ is a straight or branched chain $C_2$–$C_8$ alkylene group and $R^2$ and $R^3$ are, individually, $C$–$C_4$ alkyl, and their quaternized counterparts.